United States Patent
Coleman et al.

(10) Patent No.: US 9,594,703 B2
(45) Date of Patent: Mar. 14, 2017

(54) ARCHITECTURE AND METHOD FOR MANAGING INTERRUPTS IN A VIRTUALIZED ENVIRONMENT

(75) Inventors: James A. Coleman, Mesa, AZ (US); Scott M. Oehrlein, Chandler, AZ (US)

(73) Assignee: INTEL CORPORATION, Santa Clara, CA (US)

(*) Notice: Subject to any disclaimer, the term of this patent is extended or adjusted under 35 U.S.C. 154(b) by 703 days.

(21) Appl. No.: 13/976,999

(22) PCT Filed: Mar. 29, 2012

(86) PCT No.: PCT/US2012/031310
§ 371 (c)(1),
(2), (4) Date: Jun. 27, 2013

(87) PCT Pub. No.: WO2013/147817
PCT Pub. Date: Oct. 3, 2013

(65) Prior Publication Data
US 2014/0082240 A1   Mar. 20, 2014

(51) Int. Cl.
G06F 13/24   (2006.01)
G06F 9/455   (2006.01)
G06F 9/48   (2006.01)

(52) U.S. Cl.
CPC ......... *G06F 13/24* (2013.01); *G06F 9/45533* (2013.01); *G06F 9/45558* (2013.01); *G06F 9/4812* (2013.01); *G06F 2009/45579* (2013.01)

(58) Field of Classification Search
CPC ... G06F 9/45533; G06F 9/45558; G06F 13/24
See application file for complete search history.

(56) References Cited

U.S. PATENT DOCUMENTS

| | | | |
|---|---|---|---|
| 7,191,440 B2* | 3/2007 | Cota-Robles | G06F 9/4881 714/E11.2 |
| 7,356,817 B1* | 4/2008 | Cota-Robles | G06F 9/45537 710/262 |
| 7,904,903 B2* | 3/2011 | Grobman | G06F 9/461 718/1 |
| 8,286,162 B2* | 10/2012 | Neiger | G06F 9/45533 710/260 |
| 8,495,651 B2* | 7/2013 | Kanai | G06F 9/45537 718/107 |
| 8,516,479 B2* | 8/2013 | Hattori | G06F 9/45558 718/1 |
| 8,566,492 B2* | 10/2013 | Madukkarumukumana | G06F 9/4812 710/260 |
| 8,819,699 B2* | 8/2014 | Cota-Robles | G06F 9/45558 719/313 |

(Continued)

OTHER PUBLICATIONS

International Search Report and Written Opinion, Mailed Date: Nov. 28, 2012, Application No. PCT/US2012/031310, Filed Date: Mar. 29, 2012, pp. 10.

(Continued)

*Primary Examiner* — Brian Misiura

(57) ABSTRACT

A method may comprise identifying a signal indicating real-time mode operation for a guest operating system (OS) and directly routing an interrupt for a first processor to the guest OS while the guest OS is running without causing a transition from execution by the guest OS to execution by a host system. Other embodiments are disclosed and claimed.

21 Claims, 11 Drawing Sheets

(56) References Cited

U.S. PATENT DOCUMENTS

| | | | |
|---|---|---|---|
| 8,887,139 B2* | 11/2014 | Park | G06F 9/45533 717/128 |
| 8,892,802 B2* | 11/2014 | Amit | G06F 9/45558 710/260 |
| 9,086,913 B2* | 7/2015 | Shanbhogue | G06F 9/4812 |
| 2006/0112394 A1 | 5/2006 | Asai et al. | |
| 2010/0138208 A1* | 6/2010 | Hattori | G06F 9/45558 703/25 |
| 2011/0161541 A1* | 6/2011 | Madukka-rumukumana | G06F 13/24 710/260 |

OTHER PUBLICATIONS

Miri Park, et al., "A Step to Support Real-Time in Virtual Machine", In: IEEE Consumer Communications and Networking Conference 2009, 6th Annual Conference, Jan. 13, 2009, pp. 1, 4-5.
Extended European Search Report received for European Patent Application No. 12872994.4, mailed Nov. 9, 2015, 11 pages.
Zabaljauregui, Matias, "Hardware Assisted Virtualization Intel Virtualization Technology", XPo55221600, Jun. 1, 2008, 54 pages.
Yu et al., "A novel multi-OS architecture for robot application", Robotics and Biometrics (ROBIO), IEEE International Conference, XP032166139, 2011, 6 pages.

* cited by examiner

ARCHITECTURE AND METHOD FOR MANAGING INTERRUPTS IN A VIRTUALIZED ENVIRONMENT

BACKGROUND

Currently, many devices require real-time operating systems for optimal functioning, while needs for non-real-time applications are still prevalent. With the proliferation of processing architectures such as multiple core processors, it may be useful to fulfill both needs in a single platform, which is made feasible by the increasing complexity of processor cores.

Virtualization has long been used to service multiple application domains safely and reliably. This allows for load balancing as well as robustness. However, at present real-time operating systems cannot easily exist as truly virtualized entities without sacrificing responsiveness. This is caused in large part by the process of handling interrupts in a virtualized environment.

In some arrangements, a program such as a hypervisor, also referred to as a virtual machine manager (VMM), presents a virtual operating platform to multiple operating systems known as guests, or guest operating systems. The term "virtual machine" (VM), which represents an entity managed by the hypervisor, generally refers to a completely isolated guest operating system installation within a normal host operating system.

The hypervisor may be installed on a hardware host whose task is to run the guest OS. When applications run in a virtualized environment, the hypervisor manages interrupts for an application of a given guest OS. For example, when an interrupt meant for a first guest OS is delivered to the hypervisor, a virtual machine (VM) exit is triggered, in which a transition from guest execution to host execution takes place. After an interrupt is successfully handled in the hypervisor, a subsequent VM entry takes place and the interrupt is injected into the guest OS. The guest OS then resumes execution and now sees the interrupt injected by the hypervisor as an interrupt generated from one of the guest OS' own devices. The handling of interrupts can result in an interrupt latency having a duration that is many times that of the interrupt latency engendered when a non-virtualized application is running directly on the hardware host. Since many applications are sensitive to interrupt latency, this increased latency, among other factors, restricts the widespread adoption of virtualization.

It is with respect to these and other considerations that the present improvements have been needed.

DETAILED DESCRIPTION

Figure 1:
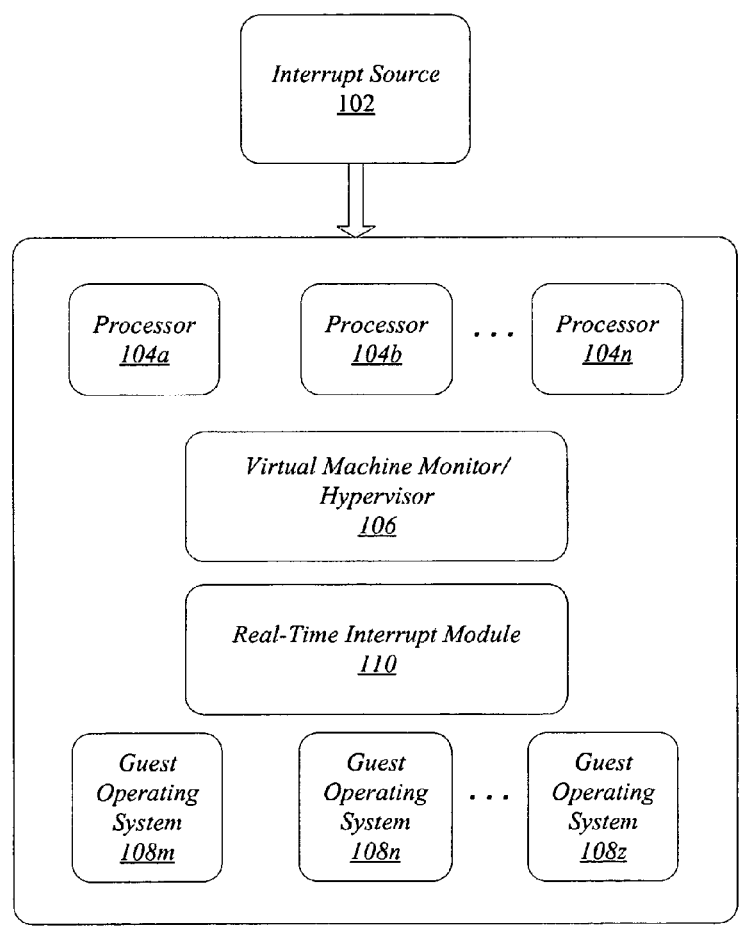
FIG. 1 illustrates one embodiment of a first system.

Various embodiments are directed to techniques for managing interrupts in a virtualized environment. The embodiments can, among other benefits, improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

In various embodiments, hardware and/or software interrupts may be managed to reduce interrupt latency in an application when the application is running in a guest operating system. Various embodiments present a novel architecture that reduces overhead associated with interrupts for real time applications by providing pseudo-posted interrupts. In various embodiments, the guest OS directly handles interrupts instead of having a hypervisor initially process the interrupts.

The reducing of overhead associated with the interrupts may allow a real time application running in a guest operating system to operate with the same interrupt latency as if the application were running directly on hardware in a non-virtualized environment. Advantages provided by the present embodiments include the ability to consolidate multiple real-time workloads. In particular, the present embodiments allow N-1 real-time workloads to be consolidated using virtualization, where N comprises any positive integer and the value N-1 is limited only by the number N of cores in a system to which a real-time operating system can be pinned to, assuming one core is to be dedicated to a hypervisor and/or other activities. The present embodiments afford the ability to run real-time applications that are sensitive to interrupt latency in a virtualized environment, thereby offering the flexibility of virtualized processing with the robustness of low latency operation. This opens up the ability to virtualize many real-time applications that heretofore have been generally limited to running on native hardware due to the criticality of minimizing interrupt latency. As an example of such applications, in various industrial control operations used to control machinery such as robotic devices, timing may be very critical, such that minimizing interrupt latency is desirable. Other examples include network applications that entail high packet rate transmission, where the ability to respond to packets in a timely fashion may be compromised by high interrupt latency, such that packets are dropped because of interrupts. This, therefore, limits the ability to run such real-time applications in a virtualized environment due to the much larger interrupt latency incurred in comparison to non-virtualized operation.

To address such problems, in various embodiments, the direct processing, or posting, of interrupts may be accomplished by providing a tick-less hypervisor for managing one or more guest OS in a system. A tick-less hypervisor does not require a timer tick, or other external interrupt for proper functioning on a processor core that is running a real-time guest OS. In other embodiments, a hypervisor may be tick-based, and may implement time slicing between multiple guests on other process cores that do not have real-time guests pinned to them.

FIG. 1 illustrates a block diagram of a system 100 for processing interrupts consistent with various embodiments. As illustrated, system 100 may receive an interrupt (not separately shown) from an interrupt source 102 for processing by an application running on system 100. In cases where the interrupt 102 source delivers a hardware interrupt, the interrupt may be a signal from a hardware device that is sent to a processor device when the processor device is to perform an operation. The destination processor device may then stop normal processing, such as the running of an application, and may execute a routine or program in memory that is associated with the interrupt source 102. As illustrated in FIG. 1, the system 100 may include one or more processors 104a-104n, which may be processor cores in a multi-core platform in some embodiments. The system 100 also includes a hypervisor 106, and one or more guest operating systems (OS) 108m-108z, where a, n, m, and z represent any positive integers. The one or more guest OS 108m-108z may run on top of the hypervisor 106 in a virtualized environment, as further depicted in FIG. 2. System 100 also includes a real-time interrupt module 110 for managing interrupts, whose operation is described below.

Figure 2:
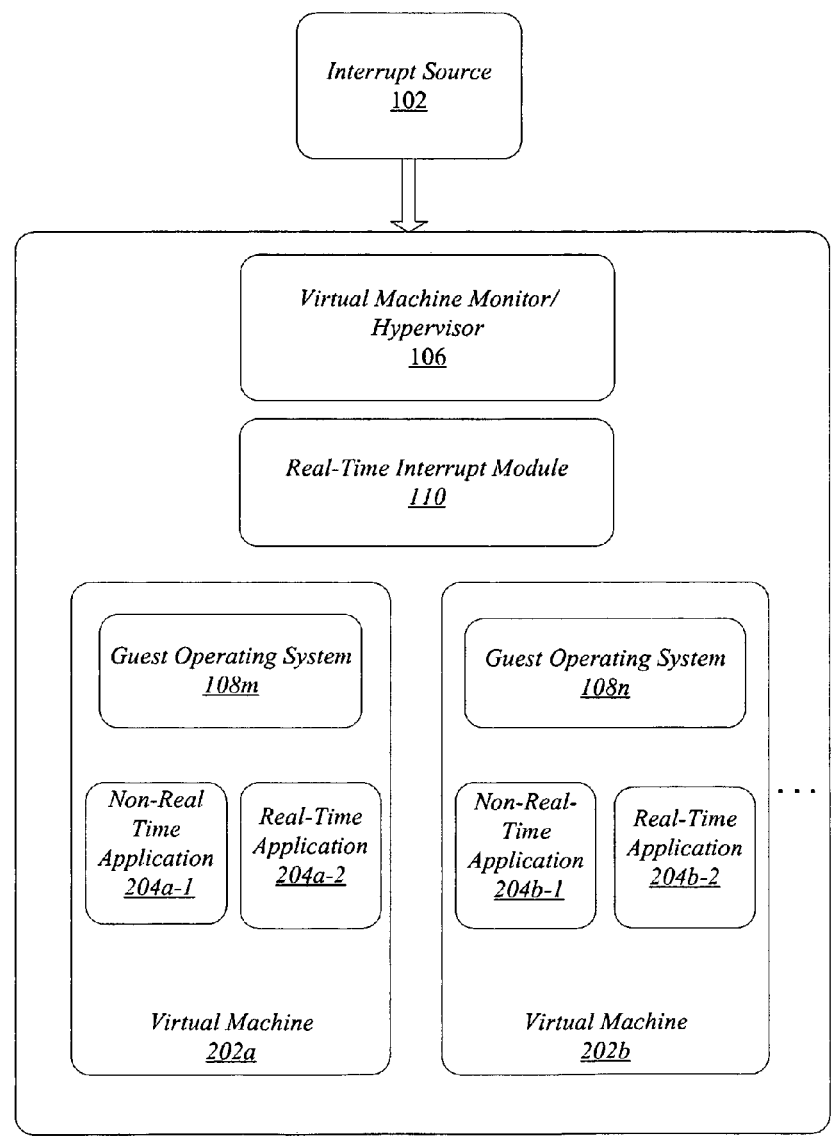
FIG. 2 illustrates details of the architecture of system of FIG. 1.

Consistent with further embodiments, FIG. 2 illustrates details of the architecture of system 100 of FIG. 1. FIG. 2 depicts two virtual machines (VM) 202a, 202b, which include the respective guest OS 108m, 108n. Each VM 202a, 202b additionally includes applications, such as respective non-real-time applications 204a-1, 204b-1, and real-time applications 204a-2, 204b-2. In various embodiments, the real-time interrupt module 110 may be employed to manage interrupts meant for a guest OS when the guest OS is running a real time application, and when the guest OS is running a non-real-time application. The real-time interrupt module 110 may be embodied in software, hardware, or a combination of hardware and software. In some embodiments, the real-time interrupt module may be included in the hypervisor 106, one or more guest OS 108m-108z, and/or other portions of processors 104a-104n.

In some embodiments where the real-time interrupt module 110 is included at least in part in the hypervisor 106, the hypervisor 106 may be modified from conventional operations such that it is operable to support two separate modes of operation for one or more of the guest OS 108m-108z. In a first mode of operation, a non-real-time mode of operation, the hypervisor 106 may perform as conventional hypervisors in which interrupts to be applied to a given processor 104a-104n are handled by the hypervisor 106. The non-real-time mode of operation may be appropriate for management of one or more of the guest OS 108m-108z when a non-real-time application is running, such as the aforementioned non-real-time applications 204a-1, 204b-1. In this manner, because the non-real time applications may not be sensitive to interrupt latency, the overhead engendered by hypervisor handling of the process interrupts may be tolerable, allowing the hypervisor 106 to process the interrupts in a conventional manner.

Figure 3:
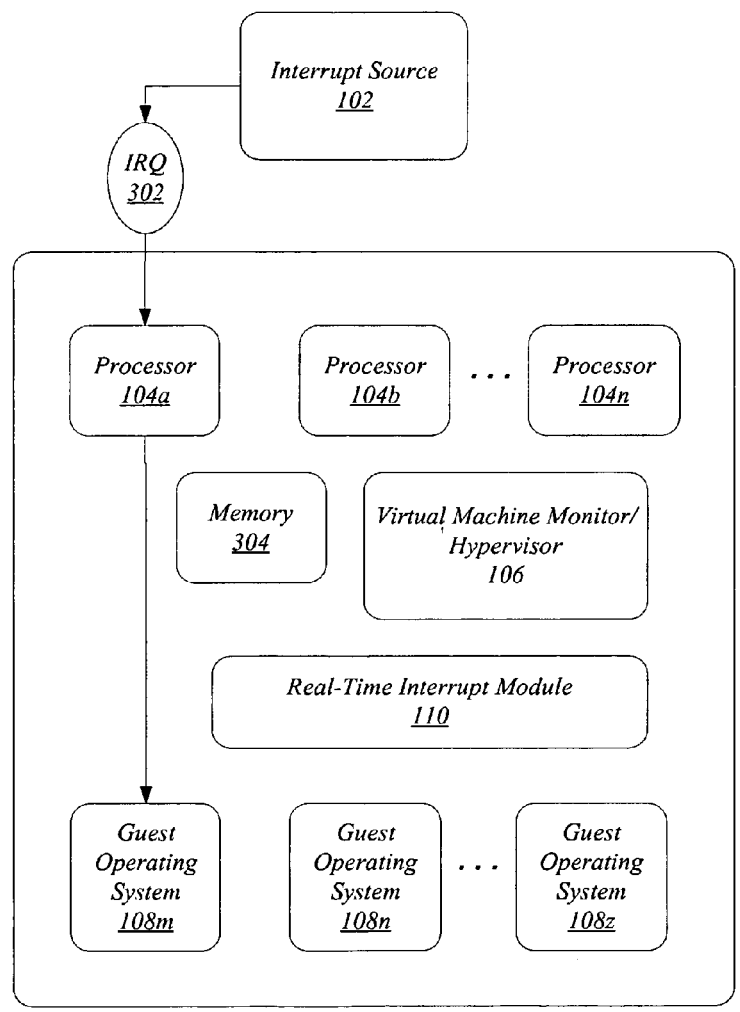
FIG. 3 depicts one example of interrupt handling consistent with the present embodiments.

In various embodiments, one or more of the guest OS 108m-108z may enter a second, real-time mode of operation, which may be desirable when a real time application, such as real-time applications 204a-2, 204b-2, are running In the real-time mode of operation, as illustrate in FIG. 3, all external interrupts may be routed directly to a destination guest OS instead of being processed by the hypervisor 106. FIG. 3 depicts one example of interrupt handling in real-time mode of operation consistent with the present embodiments. The interrupt source 102 may generate an interrupt, shown as an interrupt request (IRQ) 302, which processor 104a routes directly to the guest OS 108m. In this manner, an incoming interrupt may be routed to the guest OS without incurring a VM exit event, which refers to a transition between a so-called non-root mode of operation to a root mode of operation. Root mode of operation refers to the state when a processor may operate a host system without virtualization, or when a hypervisor controls operation when virtualization is active. In a non-root mode, processor operation is different. For example, a structure such as a virtual machine control structure (VMCS) may be used to control processor operation and to determine how certain instructions are executed. The VMCS may be located in a memory 304 that stores the complete CPU state of both the host and the guest, as well as some control bits (for example, when to exit from a current mode). Non-root mode in particular is used when a guest OS is running. Accordingly, a VM exit event may entail a transition from execution of instruction by the VM or guest OS to execution by the host or hypervisor. Since, in the example of FIG. 3, the IRQ 302 is routed directly to the guest OS 108m, the hypervisor 106 is not invoked, and a VM exit does not occur.

The prevention of a VM exit event afforded by the ability to operate in real-time mode of operation may be particularly useful when running a real-time application because of the extra processing steps averted. Moreover, the ability to switch between real-time and non-real-time modes of operation provides flexibility for operation of applications that may not be strongly sensitive to interrupt latency.

Thus, for example, in a non-real-time mode of operation, when the guest OS 108m is running non-real-time application 204a-1, receipt of an interrupt by hypervisor 106 may engender a VM exit in which instruction execution is transferred from guest OS 108 to the hypervisor 106. When the interrupt handling is completed, a VM entry may be performed, which refers to a transition from root mode to non-root mode operation. Thus, after the VM entry takes place, execution reverts back to guest OS 108m, and the non-real-time application 204a-1 runs as before the interrupt was received. The VM entry and VM exit events may create significant latency each time an interrupt is processed while the guest OS 108m system is running the non-real-time application 204a-1. However, this interrupt latency may be acceptable if the non-real time application 204a-1 is sufficiently insensitive to interrupt latency.

In contrast, when the guest OS 108m is running real-time application 204a-2, any VM exit and/or VM entry operations performed while the real-time application 204a-2 is running may incur an interrupt latency whose duration is intolerable or undesirable for optimal operation of the real-time application 204a-2. Thus, it may be desirable for the guest OS 108m to enter into a real-time mode of operation in which interrupts do not engender a VM exit when real time application 204a-2 is to be run, and are instead routed directly to the guest OS 108m, as depicted in FIG. 3.

In various embodiments, the real-time mode of operation in a system supporting virtualized operation of real-time applications may be initiated when a guest OS is running on a hypervisor. For example, the guest OS may generate a signal to enter real-time mode operation when a real-time application is running or is to be run by the guest OS. In embodiments in which at least a portion of the real-time interrupt module 110 is embodied in the hypervisor 106, the specific signal generated by the guest OS for real-time mode of operation may be routed to the hypervisor. When the hypervisor receives the specific signal, the hypervisor may identify the signal as indicating real-time mode operation for a guest OS is requested. Subsequently, operation of the system 100 may be modified such that an interrupt for a given processor is directly routed to the core to the guest OS while the guest OS is running without causing a VM exit operation.

In one embodiment, the guest OS may make a "VMCall" to the hypervisor indicating that the guest OS is ready to enter real-time mode of operation. In response, the hypervisor may take one or more actions to set operations for real-time mode. In some embodiments, the hypervisor may perform alterations in a VMCS of the processor running the guest OS. For example, the hypervisor may alter a field in the VMCS that determines whether or not a received interrupt is to cause a VM exit. Thus, the hypervisor may "clear" a bit that indicates the interrupt is to cause a VM exit. Subsequently, when an interrupt is received by the processor running the guest OS, no VM exit takes place, the processor remains in non-root mode of operation, and the guest OS remains in real-time mode of operation.

It is to be noted that in embodiments where a VM exit is disabled for received external interrupts, all interrupts sent to a processor running the guest OS will be received by the guest OS. This includes, among other types of interrupts, inter processor interrupts (IPIs). Thus, it is desirable that the hypervisor upon which the guest OS is running does not send any interrupts, including timer interrupts, to the processor running the guest OS. Accordingly, consistent with various embodiments, when a guest OS that runs a real-time application may be pinned to a specific processor. For example, referring again to FIG. 1, guest OS 108m may be pinned to processor 104a, guest OS 108n may be pinned to processor 104b, and so forth. In embodiments of a multi-core platform, each processor 104a-104n may represent a separate processor core. This allows the guest OS to program a real-time device to target the processor (core) to which the guest OS is pinned, and thereby always receive those interrupts on that processor (core). In some embodiments, the real-time interrupt module 110 may pin the guest OS to a specific processor core so that migration does not take place between different processor cores, even when the real-time application is not running on the guest OS, while in other embodiments the hypervisor 106 may be operable to migrate a guest OS between different processors or cores in a limited fashion, wherein, any time a guest OS is migrated, the hypervisor 106 updates various data structures to assure correct interrupt forwarding.

Consistent with various embodiments, because all interrupts for a given processor may be received by the guest OS running on that processor, the format of interrupts may be modified as needed so that an interrupt is delivered to the guest OS in a format that allows the guest OS to correctly interpret the interrupt. In one embodiment, the hypervisor 106, via the real time interrupt module 110, may create direct translations for interrupts destined for the guest OS. The translations may translate an interrupt generated by hardware from a first format to a second format in which the guest OS properly processes the interrupt.

Figure 4:
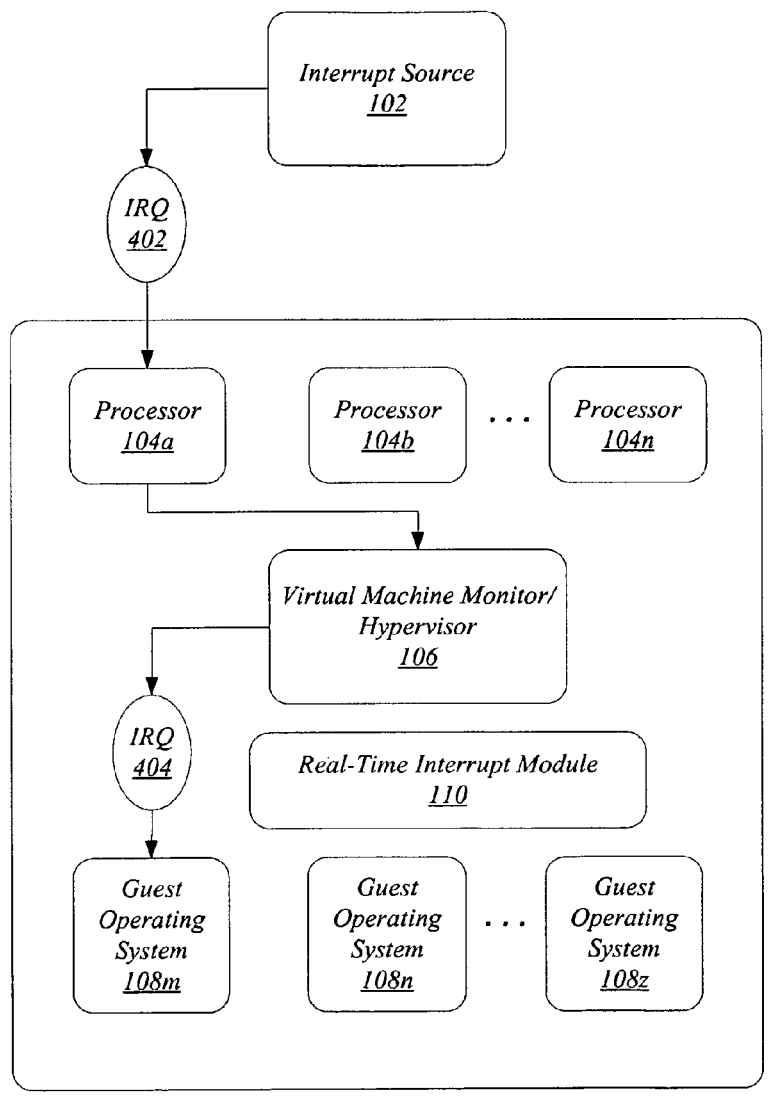
FIG. 4 illustrates one example of interrupt translation consistent with the present embodiments.

FIG. 4 illustrates one example of interrupt translation consistent with the present embodiments. In the example illustrated, the interrupt source 102 may generate an IRQ 402 having a specific format. For example, the interrupt source may be hardware of a robotic device that generates an interrupt "4" (corresponding to the format of IRQ 402) to indicate a specific action. The IRQ 402 may be delivered to the hypervisor 106, which may recognize that the interrupt "4" denotes a specific action corresponding to an interrupt "12" in the format of the guest OS 108m. Accordingly, the hypervisor may perform a translation of the interrupt "4" into an interrupt "12" using, for example, a software routine. The translated interrupt may be forwarded as IRQ 404 to the guest OS 108m, which correctly interprets the interrupt as indicating the specific action denoted by the interrupt "4" generated by the interrupt source 102, and accordingly processes the interrupt in the correct fashion.

In some embodiments, a hardware translation table (not shown) may be used to translate an interrupt from a format generated by a hardware interrupt source to the correct format of the real-time guest OS. For example, returning to the previous example, the translation between interrupt "4" and interrupt "12" to denote a specific hardware interrupt may be programmed into the hardware or a device driver controlling the hardware.

In various additional embodiments, settings may be adjusted to ensure that a guest OS is not pre-empted from running unless the guest OS executes an instruction to cause a VM exit. In one embodiment, real time interrupt module 110 may modify the typical hypervisor initialization to disable HLT exiting. The term "HLT exiting" refers to performing a VM exit when a "halt" (HLT) command is executed by the processor running the guest OS. Thus, referring again to FIG. 1, when guest OS 108m is running on processor 104a, the processor, via guest OS 108m, may execute an HLT instruction, which places the processor 104a in the idle state. Under conventional operation, the execution of the HLT instruction may cause a VM exit in which a transition to root mode of operation takes place. Thus, the hypervisor 106 may be invoked, such that when the idle state is terminated, the guest OS 108m is no longer running. Instead, consistent with the present embodiments, because the VM exit is not triggered by execution of the HLT instruction, the guest OS 108m retains processor control after the processor 104a exits the idle state. In one embodiment, the disabling of HLT exiting may be accomplished by modifying a control field. For example, a value of a bit that specifies whether a guest execution of the HLT instruction causes a VM exit may be set to "zero" to indicate that VM exit does not take place upon HLT execution. While disabling of HLT exiting prevents a processor that the guest is running on from being used by other virtual machines, the disabling may assure low latencies by maintaining control by the guest OS.

In order to minimize the effect of interrupt latency it may also be desirable to minimize additional events that may pre-empt the guest OS, especially when a critical real-time application is running on the guest OS. Accordingly, when running in real-time mode of operation, the real time interrupt module 110 may direct the guest OS to reduce or eliminate actions that may induce a VM exit.

It is to be noted that disabling pre-emption of a guest OS in accordance with the present embodiments may change the manner in which device drivers are emulated in the hypervisor. For example, if a hard drive in a system is to be shared, under conventional operation in which a virtualized processor is running a guest OS, an interrupt that is generated by the hard drive is routed to a bootstrap processor, which correctly forwards the interrupt to the virtualized processor. This precipitates a VM exit, upon which the hypervisor on that processor injects an interrupt through the VMCS.

According to the present embodiments, however, the real time interrupt module 110 may temporarily modify operation of the bootstrap processor or send a signal to the bootstrap processor that directs it to forward the interrupt generated by the hard drive as an inter-processor interrupt (IPI) to the real-time guest processor to mimic the translated interrupt.

Figure 5:
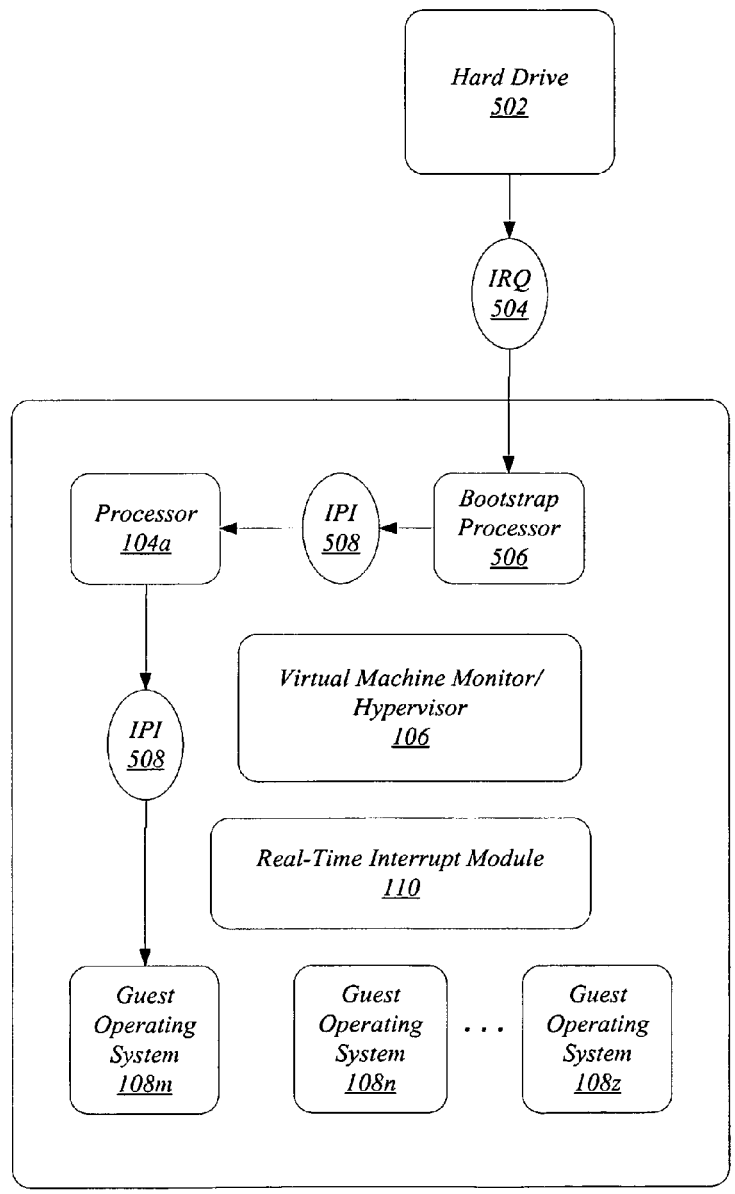
FIG. 5 depicts one scenario for processing an interrupt consistent with various embodiments.

FIG. 5 depicts one scenario for processing an interrupt consistent with various embodiments. As illustrated, a hard drive 502 generates an interrupt IRQ 504. The interrupt is received by a bootstrap processor 506, which sends the interrupt as IPI 508 to the processor 104a. The IPI 508 may be routed to the guest OS 108m without invoking hypervisor 106.

In accordance with further embodiments, the manner of handling an end of interrupt (EOIs) may be adjusted. An EOI is a signal that is sent to a programmable interrupt controller (PIC), which may be an advance PIC (APIC), to indicate the completion of interrupt processing for a given interrupt. In the case of conventional processing of EOIs, when a guest OS is running, when an interrupt process is complete the guest OS generates the EOI, which induces a VM exit. The hypervisor upon which the guest OS is running is invoked, and, if the interrupt has been handled correctly, forwards the EOI to the PIC. The EOI may then be used to cause the PIC to clear a corresponding bit in a register, such as an In-Service Register (ISR), and thus allow more IRQs to be generated by the PIC. However, each time the guest OS generates an EOI, the operation mode shifts from non-root mode to root mode of operation and control reverts to the hypervisor. Thus, even if the incoming IRQs were initially set to bypass the hypervisor while the guest OS is running, interrupts processed after the EOI-generated VM exit will incur a latency due to the fact that the guest OS is no longer running.

Accordingly, in various embodiments, a local PIC, such as an APIC, may be programmed, for example, by the real-time interrupt module 110, so that EOI generation does not cause a VM exit. Thus, when handling of an interrupt is complete, and an EOI is generated, the hypervisor is not invoked and the guest OS remains running.

Figure 6:
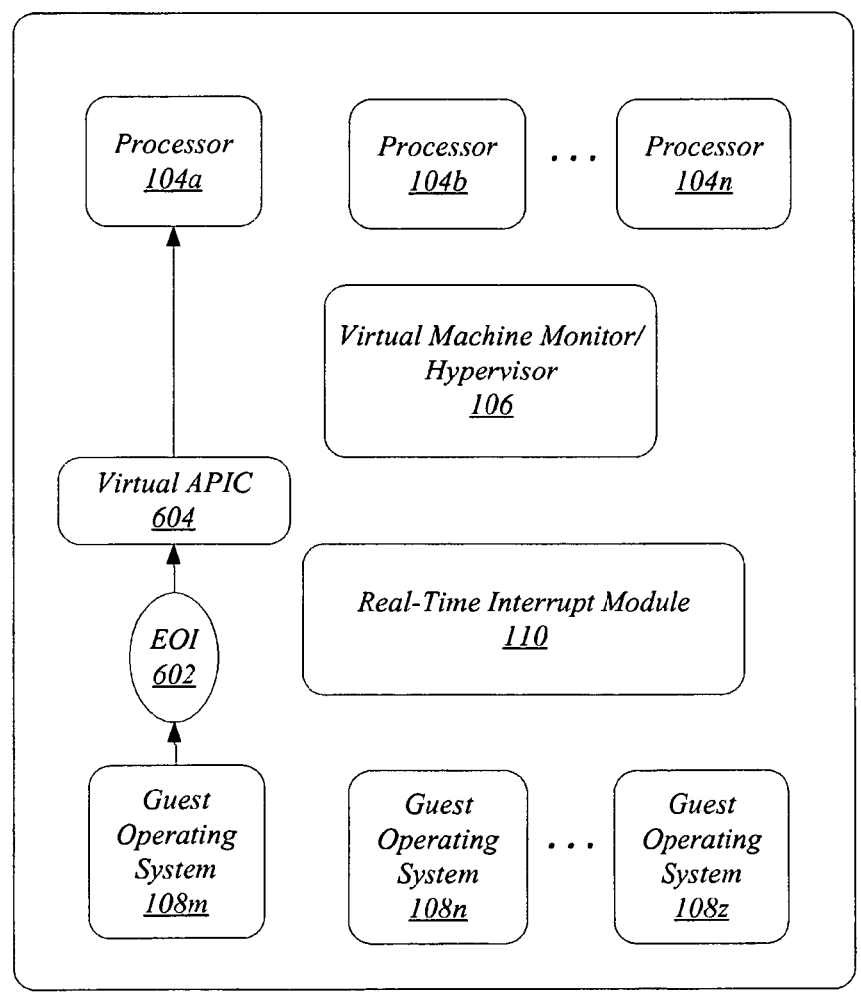
FIG. 6 depicts one scenario for processing an end-of-interrupt consistent with various embodiments.

FIG. 6 depicts one scenario for processing an EOI consistent with various embodiments. As illustrated, the guest OS 108m generates an EOI 602, which may occur after successful handling of an interrupt while the guest OS 108m is operating in real-time mode as discussed above. The EOI 602 may be sent to a virtual APIC 604, which may be arranged to perform at least some of the functions of a conventional hardware APIC. When the EOI 602 is generated, the virtual APIC 604 may determine based upon a setting in a data structure, such as an EOI bitmap, whether a VM exit is to occur. In the scenario illustrated, the EOI 602 does not cause a VM exit, the hypervisor 106 is not invoked, and the APIC 604 may signal the processor 104a as to completion of the interrupt associated with EOI 602, so that further interrupts may be processed as needed. In this manner, any latency resulting from a VM exit and/or VM entry is avoided and any real-time application running on guest 108m may continue having incurred minimal delay due to receiving, handling, and completing an interrupt without exiting non-root mode.

In some embodiments in which a virtual APIC is not used, native interrupt latency may still be achieved, but at a much lower frequency. In other words, when an interrupt is received and the guest OS is running in real-time mode, the interrupt may be directed to the guest OS without incurring a VM exit. However, to acknowledge the interrupt, the hypervisor is invoked by generation of the EOI.

Table I. presents a summary of various settings that may be employed to manage interrupts during running of a guest OS according to one embodiment. As illustrated, the "external interrupt exiting" bit may be set to "0" in order direct an external interrupt directly to a guest rather than cause a VM exit. For example, the interrupt may be delivered directly to the guest interrupt descriptor table (IDT), which associates an interrupt request with the appropriate interrupt handler. When the bit is set to "1" a VM exit results from receipt of the interrupt, as discussed above.

TABLE I

| Register/Bit Name | Value | Description | Purpose |
| --- | --- | --- | --- |
| External-interrupt Exiting | 0 | Determines whether an external interrupt causes a VM exit or if interrupt is delivered directly to guest IDT | By causing interrupts to be directed to the guest IDT, the guest receives the interrupt as if it weren't virtualized |
| Virtualize APIC accesses | 0 | Determines whether guest access to APIC page causes a VM exit | Since hardware is able to emulate a guest APIC, the host no longer does |
| Use TPR Shadow | 1 | Determines whether a guest OS write to the TPR in the APIC causes a VM exit | Since no virtual APIC is being kept by the host, the hardware handles TPR writes |
| EOI Bitmap | 1 | If bitmap[vector] is 1, EOI is directed to the virtualized APIC page, else a VM-exit occurs | Some EOIs should cause VM exits, such as interrupts not intended for guest OS |
| APIC-register Virtualization | 1 | If 1, a guest access (read/write) to APIC page is directed to virtualized APIC, else a VM exit occurs | This completes a fully virtualized (ie, no VM exit) handling of real-time interrupts |
| HLT Exiting | 0 | Determines whether a guest execution of the HLT instruction causes a VM exit | This ensures the guest OS is running (ie, doesn't yield processor) when interrupts arrive, even if the processor spends time in an idle state |

Similarly, the "virtualize APIC accesses" bit may be set to "0" so that when the guest OS tries to access an APIC page, a VM exit does not take place.

The APIC for a given processor running the OS has a feature termed a task priority register (TPR), which provides a special memory location via which the (guest) OS may communicate with the APIC. The value of the "use TPR shadow" bit determines whether a guest OS write to the TPR in the APIC causes a VM exit.

As further illustrated in Table I. and discussed previously, the EOI bitmap may be set to "1" so that the EOI generated by the guest OS is directed to a virtualized APIC page; otherwise, when the bitmap is set to "0", a VM exit occurs. The same applies to the "APIC-register virtualization" entry, where, if the value is "1," a guest OS access (read/write) to an APIC page is directed to a virtualized APIC, else a VM exit occurs. Finally, the "HLT exiting" bit may be set to zero to disable VM exit when an HLT command is executed, as previously discussed. The group of settings illustrated in Table I are merely exemplary and other combinations of settings of bitmaps/registers, as well as additional or different bitmaps/registers may be employed depending, for example, on the application.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
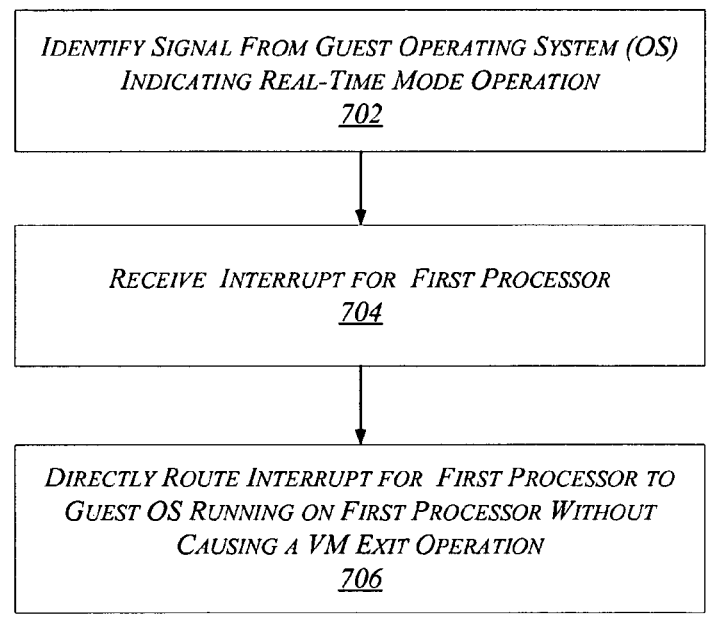
FIG. 7 illustrates one embodiment of a first logic flow.

FIG. 7 illustrates an exemplary logic flow 700. At block 702, a signal is identified that is sent from a guest OS that indicates real-time mode operation. The signal may take the form of a VM call, for example. At block 704, an interrupt, such as an external interrupt, is received for a first processor. At block 706, the interrupt for the first processor is directly routed to a guest OS that is running on the first processor without causing a VM exit operation where a transition between non-root mode of operation to root mode of operation would have otherwise happened.

Figure 8:
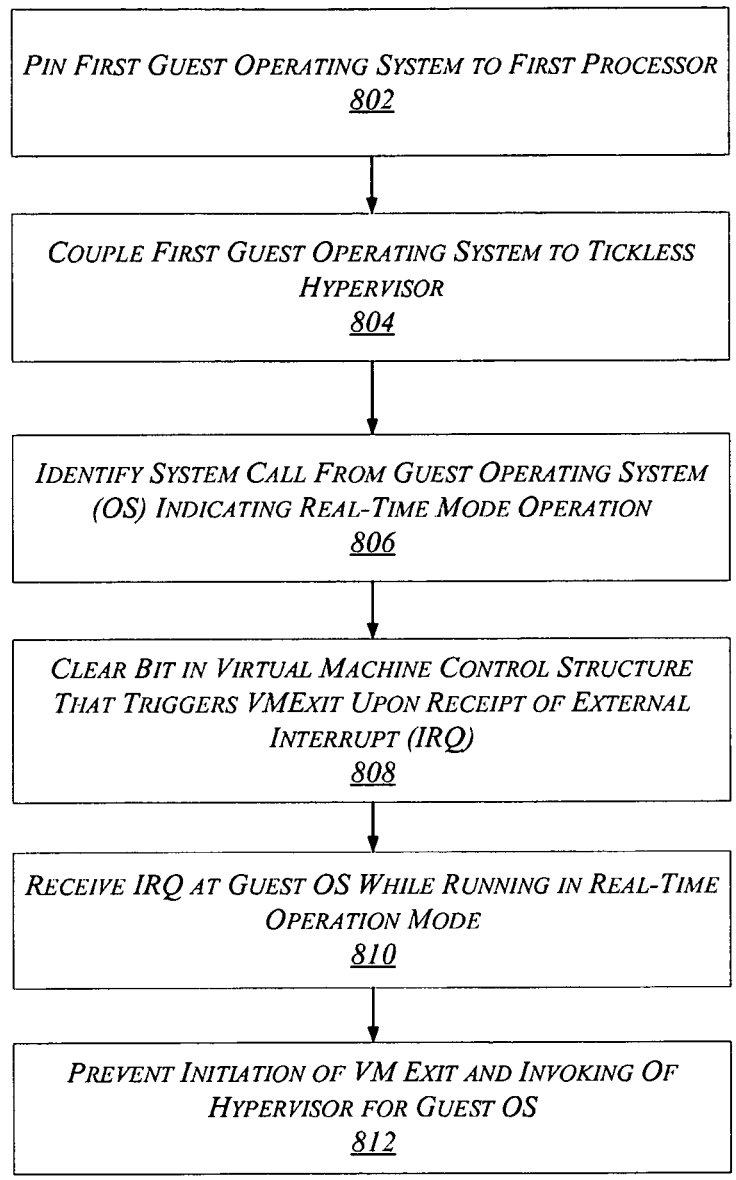
FIG. 8 illustrates one embodiment of a second logic flow.

FIG. 8 illustrates an exemplary logic flow 800. At block 802, a guest OS is pinned to a first processor. At block 804 the first guest OS system is coupled to a tickless hypervisor. At block 806, a system call is identified from a guest OS that indicates real-time mode of operation. At block 808, a bit is cleared in a virtual machine control structure (VMCS) that triggers a VM exit when an external interrupt is received. At block 810, an external interrupt is received at the guest OS while the guest OS is running in real-time mode of operation. At block 812, because the bit is cleared in the VMCS, a VM exit is prevented and the hypervisor is not invoked.

Figure 9:
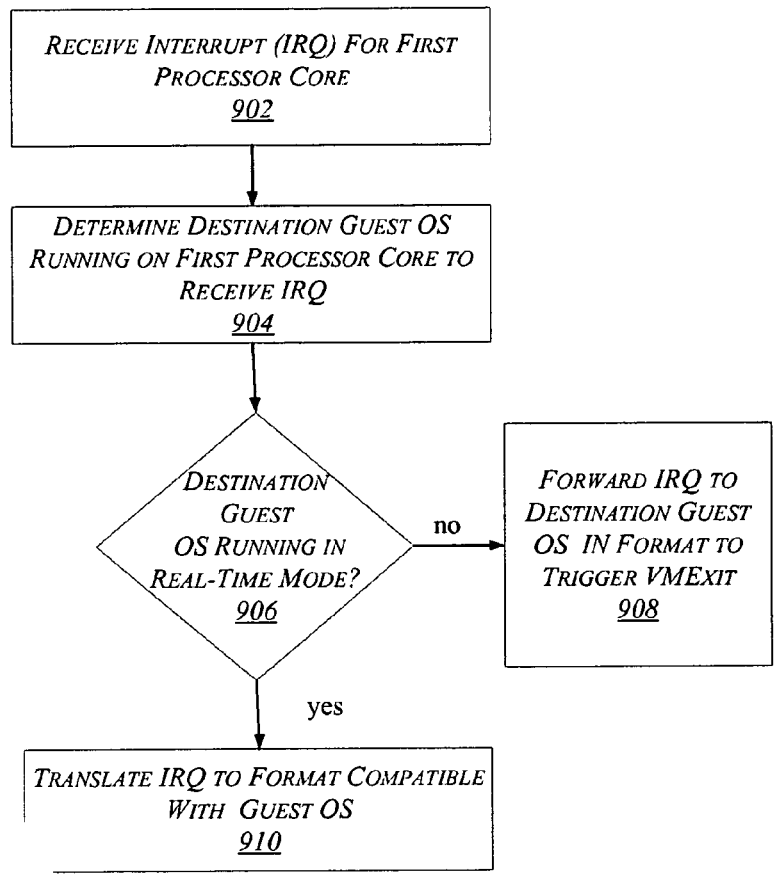
FIG. 9 illustrates one embodiment of a third logic flow.

FIG. 9 illustrates another exemplary logic flow 900. At block 902, an interrupt is received for a first processor, such as a first processor core. At block 904, a destination guest OS running on the first processor core is determined. The flow then moves to block 906 where it is determined as to whether the guest OS running on the first processor core is in real-time mode of operation. If not, the flow proceeds to block 908 where the interrupt request is forwarded to the destination guest OS to trigger a VM exit. If, at block 906, the guest OS is running in real-time mode of operation, the flow moves to block 910, where the interrupt request is translated into a format compatible with the guest OS. In this manner, the guest may interpret the interrupt and process the interrupt request in the proper fashion.

Figure 10:
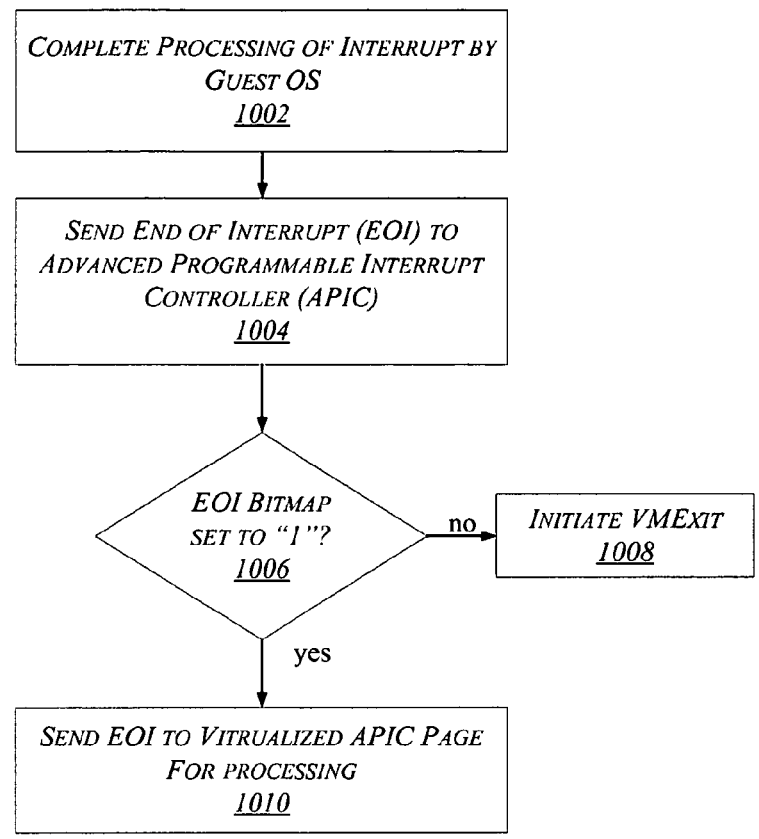
FIG. 10 illustrates one embodiment of a fourth logic flow.

FIG. 10 illustrates a further exemplary logic flow 1000. At block 1002, the processing of an interrupt is completed. At block 1004, an end-of-interrupt (EOI) is sent to a controller, such as an advanced programmable interrupt controller (APIC) for processing. The flow then moves to block 1006, where the bit value of an EOI bitmap is checked. If the bitmap value is not set to "1", the flow moves to block 1008, where a VM exit is initiated. If the bitmap value does equal "1," the flow moves to block 1010 where the EOI is directed to a virtualized APIC page for processing.

Figure 11:
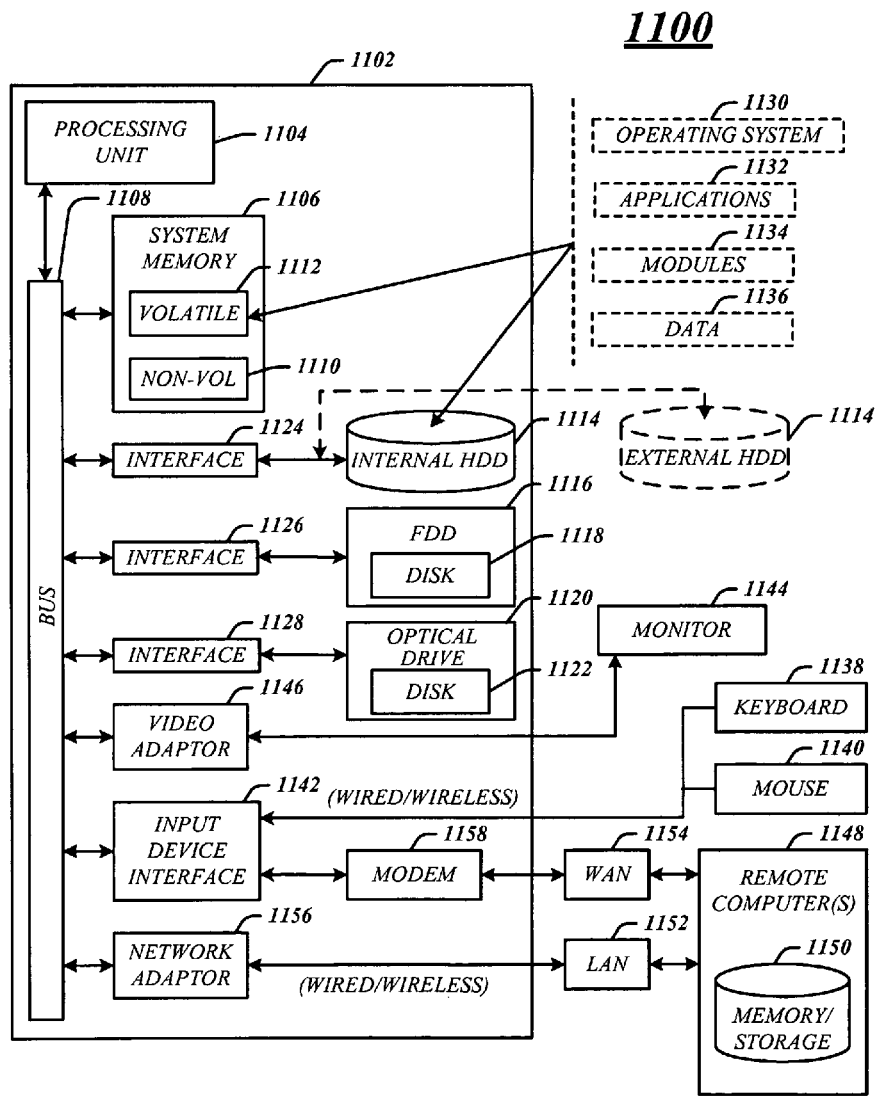
FIG. 11 illustrates an embodiment of a computing architecture.

FIG. 11 illustrates an embodiment of an exemplary computing architecture 1100 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi-processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The electronic device 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

The one or more application programs 1132, other program modules 1134, and program data 1136 can include, for example, the search component 122 and the display component 124.

A user can enter commands and information into the electronic device 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The electronic device 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the electronic device 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the electronic device 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 856.

When used in a WAN networking environment, the electronic device 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the electronic device 1102, or portions thereof, can be stored in the remote memory/storage device 1150. It will be appreciated that the network connections shown are exemplary and other means of establishing a communications link between the computers can be used.

The electronic device 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In one embodiment, a computer implemented method may include identifying a signal indicating real-time mode operation for a guest operating system (OS) and directly routing an interrupt for a first processor to the guest OS while the guest OS is running without causing a transition from execution by the guest OS to execution by a host system.

In another embodiment the computer implemented method may further include, in response to the signal, clearing a bit in a virtual machine control structure (VMCS) that indicates an external interrupt is to generate a VM exit wherein a transition from execution by the guest OS to execution by a host system occurs.

Alternatively, or in addition, in another embodiment, a computer implemented method may include pinning the guest OS to the first processor during real-time operation of the guest OS.

Alternatively, or in addition, in a further embodiment, a computer implemented method may include disabling the guest OS from performing a VM exit operation when the guest OS executes an HLT instruction.

Alternatively, or in addition, in yet another embodiment, a computer implemented method may include instructing a bootstrap processor to forward an interrupt generated by a hard drive as an inter-processor-interrupt (IPI) to the guest OS.

Alternatively, or in addition, in a further embodiment, a computer implemented method may include setting a direct translation structure for interrupts to be forwarded to the guest OS.

Alternatively, or in addition, in another embodiment, a computer implemented method may include translating the interrupts into an interrupt format of the guest operating system.

Alternatively, or in addition, in a further embodiment, a computer implemented method may include programming a virtual advanced programmable interrupt controller (APIC) coupled to the first processor to prevent a VM exit when an end-of-interrupt (EOI) is generated.

Alternatively, or in addition, in another embodiment, a computer implemented method may include forwarding the EOI to a virtualized APIC page for processing.

In another embodiment, alternatively, or in addition, an apparatus may be configured to perform the method of any one of the previous embodiments.

In a further embodiment, alternatively, or in addition, at least one machine readable medium may include a plurality of instructions that in response to being executed on a computing device, cause the computing device to carry out a method according to any one of the previous embodiments.

In a further embodiment, an apparatus may include a processor circuit and a real-time interrupt module operable on the processor circuit to identify a signal received from a guest operating system (OS) running on a first processor, the signal indicating real-time mode operation for the guest OS, and to directly route an interrupt for the first processor to the guest OS without causing a transition from a non-root mode of operation to a root mode of operation.

In another embodiment, the real-time interrupt module may be operable on the processor circuit to a clear a bit in a virtual machine control structure (VMCS) that indicates an external interrupt is to generate a VM exit in response to the signal.

Alternatively or in addition, in another embodiment, the real-time interrupt module may be operable on the processor circuit to pin the guest OS to the first processor during real-time operation of the guest OS.

Alternatively or in addition, in a further embodiment, the real-time interrupt module may be operable on the processor circuit to disable the guest OS from performing a VM exit operation when the guest OS executes an HLT instruction.

Alternatively or in addition, in a further embodiment, the real-time interrupt module may be operable on the processor circuit to translate the interrupts into an interrupt format of the guest OS during real-time operation of the guest OS.

Alternatively or in addition, in another embodiment, the real-time interrupt module may be operable on the processor circuit to program a virtual advanced programmable interrupt controller (APIC) coupled to the first processor to prevent a VM exit when an end-of-interrupt (EOI) is generated, and to forward the EOI to a virtualized APIC page for processing.

Alternatively or in addition, in yet another embodiment, the real-time interrupt module may be operable on the processor circuit to direct a bootstrap processor to output an external interrupt as an inter-processor interrupt for forwarding to the guest OS.

Alternatively or in addition, in yet another embodiment, the apparatus of any of the previous embodiments may include a digital display to present output of the guest OS.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method, comprising:
identifying a signal indicating real-time mode operation for a guest operating system (OS);
disabling halt (HLT) exiting for the guest OS;
directly routing an interrupt for a first processor to the guest OS while the guest OS is running without causing a transition from execution by the guest OS to execution by a host system;
programming a virtual advanced programmable interrupt controller (APIC) coupled to the first processor to prevent a virtual machine (VM) exit when an end-of-interrupt (EOI) is generated; and
forwarding the EOI to a virtualized APIC page for processing.

2. The computer implemented method of claim 1, comprising, in response to the signal, clearing a bit in a virtual machine control structure (VMCS) that indicates an external interrupt is to generate the VM exit wherein a transition from execution by the guest OS to execution by a host system occurs.

3. The computer implemented method of claim 1, comprising pinning the guest OS to the first processor during real-time operation of the guest OS.

4. The computer implemented method of claim 1, comprising disabling HLT exiting for the guest OS by setting a value of a bit indicating whether the VM exit is to be performed when the guest OS executes an HLT instruction.

5. The computer implemented method of claim 1, comprising instructing a bootstrap processor to forward an interrupt generated by a hard drive as an inter-processor-interrupt (IPI) to the guest OS.

6. The computer implemented method of claim 1, comprising setting a direct translation structure for interrupts to be forwarded to the guest OS.

7. The computer implemented method of claim 1, comprising translating the interrupts into an interrupt format of the guest operating system.

8. An apparatus, comprising:
a processor circuit;
a real-time interrupt module operable on the processor circuit to:
identify a signal received from a guest operating system (OS) running on a first processor, the signal indicating real-time mode operation for the guest OS;
disable halt (HLT) exiting for the guest OS;
directly route an interrupt for the first processor to the guest OS without causing a transition from a non-root mode of operation to a root mode of operation;
program a virtual advanced programmable interrupt controller (APIC) coupled to the first processor to prevent a virtual machine (VM) exit when an end-of-interrupt (EOI) is generated; and forward the EOI to a virtualized APIC page for processing.

9. The apparatus of claim 8, the real-time interrupt module operable on the processor circuit to a clear a bit in a virtual machine control structure (VMCS) that indicates an external interrupt is to generate the VM exit in response to the signal.

10. The apparatus of claim 8, the real-time interrupt module operable on the processor circuit to pin the guest OS to the first processor during real-time operation of the guest OS.

11. The apparatus of claim 8, the real-time interrupt module operable on the processor circuit to disable HLT exiting for the guest OS by setting a value of a bit indicating whether the VM exit is to be performed when the guest OS executes an HLT instruction.

12. The apparatus of claim 8, the real-time interrupt module operable on the processor circuit to translate the interrupts into an interrupt format of the guest OS during real-time operation of the guest OS.

13. The apparatus of claim 8, the real-time interrupt module operable on the processor circuit to direct the bootstrap processor to output an external interrupt as an inter-processor interrupt for forwarding to the guest OS.

14. The apparatus of claim 8, comprising a digital display to present output of the guest OS.

15. At least one machine readable medium comprising a plurality of instructions that in response to being executed on a computing device, cause the computing device to:

identify a signal indicating real-time mode operation for a guest operating system (OS);

disable halt (HLT) exiting for the guest OS;

directly route an interrupt for a first processor to the guest OS while the guest OS is running without causing a transition from execution by the guest OS to execution by a host system;

program a virtual advanced programmable interrupt controller (APIC) coupled to the first processor to prevent a virtual machine (VM) exit when an end-of-interrupt (EOI) is generated; and forward the EOI to a virtualized APIC page for processing.

16. The at least one machine readable medium of claim 15, the computing device caused to in response to the signal, clear a bit in a virtual machine control structure (VMCS) that indicates an external interrupt is to generate the VM exit wherein a transition from execution by the guest OS to execution by a host system occurs.

17. The at least one machine readable medium of claim 15, the computing device caused to pin the guest OS to the first processor during real-time operation of the guest OS.

18. The at least one machine readable medium of claim 15, the computing device caused to disable HLT exiting for the guest OS by setting a value of a bit indicating whether the VM exit is to be performed when the guest OS executes an HLT instruction.

19. The at least one machine readable medium of claim 15, the computing device caused to instruct a bootstrap processor to forward an interrupt generated by a hard drive as an inter-processor-interrupt (IPI) to the guest OS.

20. The at least one machine readable medium of claim 15, the computing device caused to set a direct translation structure for interrupts to be forwarded to the guest OS.

21. The at least one machine readable medium of claim 15, the computing device caused to translate the interrupts into an interrupt format of the guest operating system.

* * * * *